(12) United States Patent
VanBlon et al.

(10) Patent No.: US 11,523,236 B2
(45) Date of Patent: Dec. 6, 2022

(54) TECHNIQUES FOR ACTIVE MICROPHONE USE

(71) Applicant: Lenovo (Singapore) Pte. Ltd., Singapore (SG)

(72) Inventors: Russell Speight VanBlon, Raleigh, NC (US); John Carl Mese, Cary, NC (US); Mark Patrick Delaney, Raleigh, NC (US); Arnold S. Weksler, Raleigh, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 17/205,449

(22) Filed: Mar. 18, 2021

(65) Prior Publication Data

US 2022/0303703 A1    Sep. 22, 2022

(51) Int. Cl.
| | |
|---|---|
| *H04R 29/00* | (2006.01) |
| *H04R 1/40* | (2006.01) |
| *H04R 3/00* | (2006.01) |
| *G10L 15/08* | (2006.01) |
| *G10L 15/22* | (2006.01) |
| *G08B 21/18* | (2006.01) |

(52) U.S. Cl.
CPC ............ *H04R 29/005* (2013.01); *G10L 15/08* (2013.01); *G10L 15/22* (2013.01); *H04R 1/406* (2013.01); *H04R 3/005* (2013.01); *G08B 21/18* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 8,639,214 B1 | 1/2014 | Fujisaki | |
| 9,071,692 B2 | 6/2015 | Sanaullah et al. | |
| 9,723,401 B2 * | 8/2017 | Chen | .................. G10L 21/0208 |
| 9,743,172 B2 * | 8/2017 | Shin | ..................... H04R 1/1091 |
| 9,940,944 B2 | 4/2018 | Finlow-Bates et al. | |
| 9,967,520 B1 | 5/2018 | Rensburg et al. | |
| 10,321,251 B1 * | 6/2019 | Thorson | ................... G06F 5/10 |
| 10,425,727 B2 * | 9/2019 | Jost | ........................ H04R 3/005 |

(Continued)

OTHER PUBLICATIONS

"Feature Extraction", Wikipedia, retrieved on Jul. 16, 2020 from https://en.wikipedia.org/wiki/Feature_extraction.

(Continued)

*Primary Examiner* — Paul W Huber
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to determine an operative microphone of the device from among plural available microphones and take one or more actions at the first device based on determining the operative microphone. The one or more actions may include, for example, presenting an indication at the device that a first microphone is the operative microphone, and/or switching the operative microphone from one available microphone to another available microphone at which audible input is already being received.

20 Claims, 5 Drawing Sheets

(56) References Cited

U.S. PATENT DOCUMENTS

| | | | |
|---|---|---|---|
| 10,652,679 B1 | 5/2020 | Boss et al. | |
| 10,685,664 B1* | 6/2020 | Kristjansson | G06F 3/167 |
| 11,303,988 B2* | 4/2022 | Vautrin | G08B 5/36 |
| 11,363,396 B2* | 6/2022 | Lovich | H04R 3/005 |
| 2010/0034366 A1 | 2/2010 | Basson et al. | |
| 2010/0080382 A1 | 4/2010 | Dresher et al. | |
| 2010/0322387 A1 | 12/2010 | Cutler | |
| 2010/0324891 A1 | 12/2010 | Cutler | |
| 2011/0014957 A1* | 1/2011 | Sugimori | H04R 1/1083 |
| | | | 455/569.1 |
| 2012/0026279 A1 | 2/2012 | Kato | |
| 2013/0177191 A1* | 7/2013 | Waguri | H04R 1/08 |
| | | | 381/356 |
| 2013/0321156 A1* | 12/2013 | Liu | H04M 1/724 |
| | | | 340/573.1 |
| 2014/0229866 A1 | 8/2014 | Gottlieb | |
| 2015/0002611 A1 | 1/2015 | Thapliyal et al. | |
| 2015/0085064 A1 | 3/2015 | Sanaullah et al. | |
| 2015/0106085 A1* | 4/2015 | Lindahl | G10L 15/32 |
| | | | 704/231 |
| 2015/0156598 A1 | 6/2015 | Sun et al. | |
| 2015/0234763 A1* | 8/2015 | Kline | G06F 13/4022 |
| | | | 710/313 |
| 2017/0006395 A1 | 1/2017 | Loo et al. | |
| 2017/0171286 A1 | 6/2017 | Coste et al. | |
| 2018/0358034 A1 | 12/2018 | Chakra et al. | |
| 2019/0014410 A1 | 1/2019 | Krishnamoorthy et al. | |
| 2019/0075382 A1 | 3/2019 | Schrader et al. | |
| 2020/0110572 A1 | 4/2020 | Lenke et al. | |
| 2020/0285443 A1 | 9/2020 | Yuan et al. | |
| 2022/0174492 A1* | 6/2022 | Milevski | H04W 12/08 |

OTHER PUBLICATIONS

Seethaler et al., "Systems and Methods To Determine Whether to Unmute Microphone Based on Camera Input", file history of related U.S. Appl. No. 16/727,836, filed Dec. 26, 2019.

\* cited by examiner

TECHNIQUES FOR ACTIVE MICROPHONE USE

FIELD

The disclosure below relates to technically inventive, non-routine solutions that are necessarily rooted in computer technology and that produce concrete technical improvements. In particular, the disclosure below relates to techniques for active microphone use.

BACKGROUND

As recognized herein, often times a device has multiple different microphones available for processing voice input. As also recognized herein, many devices employ layered, competing, and disparate ways to change operation of the various microphones at its disposal, often resulting in a failure to capture certain voice input. There are currently no adequate solutions to the foregoing computer-related, technological problem.

SUMMARY

Accordingly, in one aspect a first device includes at least one processor and storage accessible to the at least one processor. The storage includes instructions executable by the at least one processor to determine that a first microphone from among plural available microphones is being maintained in an active state by the first device. The instructions are also executable to, based on the determination that the first microphone is being maintained in the active state, present an indication at the first device that the first microphone is being maintained in the active state.

In various example implementations, the active state may include the first device processing audible input received at a respective microphone being maintained in the active state, and/or may include the first device not selecting audible input to one microphone while another microphone is being maintained in the active state.

Additionally or alternatively, the active state may include the first device providing audible input to the first microphone to a particular software application that is currently executing at the first device. The particular software application may be currently executing at the first device to provide audio generated based on audible input to the first microphone to a second device as part of a video conference. The particular software application may also be currently executing at the first device to transcribe audible input to the first microphone to text.

Still further, in some example implementations the plural available microphones may include one or more microphones that have been previously connected to the first device but that are not currently connected to the first device, and/or one or more microphones that have been previously paired with the first device but that are not currently communicating with the first device. In other example implementations, the plural available microphones may include microphones that are currently communicating with the first device but not microphones that are currently not communicating with the first device.

In various examples, the indication itself may include a graphical notification and/or audible notification, where the notification(s) may indicate that a user should switch from using a different microphone to using the first microphone.

If desired, in some examples the instructions may also be executable to determine that the first microphone is being maintained in the active state by the first device, but that voice input is being received at a second microphone that is different from the first microphone. In these examples, the instructions may then be executable to present the indication at the first device that the first microphone is being maintained in the active state based on the determination that the first microphone is being maintained in the active state, but that voice input is being received at the second microphone.

Also if desired, in some examples the instructions may be executable to identify a particular phrase as being spoken based on audible input received at the first device. Then based on identifying the particular phrase as being spoken based on the audible input, the instructions may be executable to switch from maintaining the first microphone in the active state to maintaining a second microphone in the active state. The indication may thus indicate that the first microphone is being switched from being maintained in the active state.

In another aspect, method includes determining an operative microphone of a first device from among plural available microphones and taking one or more actions at the first device based on the determining of the operative microphone.

In various examples, the one or more actions may include switching the operative microphone from a first available microphone to a second available microphone at which audible input is received, where the second available microphone is different from the first available microphone. If desired, the switching may be performed based on receipt of a wake-up word or wake up phrase at the second available microphone, with the audible input including the wake-up word or wake up phrase. But also, if desired, the audible input may not include a wake-up word, wake up phrase, or command to make the second available microphone the operative microphone.

Still further, in some examples the one or more actions may include prompting, via the first device, a user regarding switching the operative microphone from a first available microphone to a second available microphone different from the first available microphone. Additionally or alternatively, the one or more actions may include passing data regarding the operative microphone from a guest operating system of the first device to video conferencing software, and/or passing data regarding the operative microphone from a guest operating system of the first device to software presenting an active window on a display of the first device.

In still another aspect, at least one computer readable storage medium (CRSM) that is not a transitory signal includes instructions executable by at least one processor to determine that a first microphone has been selected for processing voice input using a particular application executing at a first device. The instructions are also executable to take one or more actions at the first device for the particular application to use the first microphone based on the determination.

In various examples, the determination may include determining that the first microphone has been selected for processing voice input using the particular application, but that the particular application is not currently processing voice input from the first microphone and/or not currently receiving voice input from the first microphone.

The details of present principles, both as to their structure and operation, can best be understood in reference to the accompanying drawings, in which like reference numerals refer to like parts, and in which:

DETAILED DESCRIPTION

Figure 1:
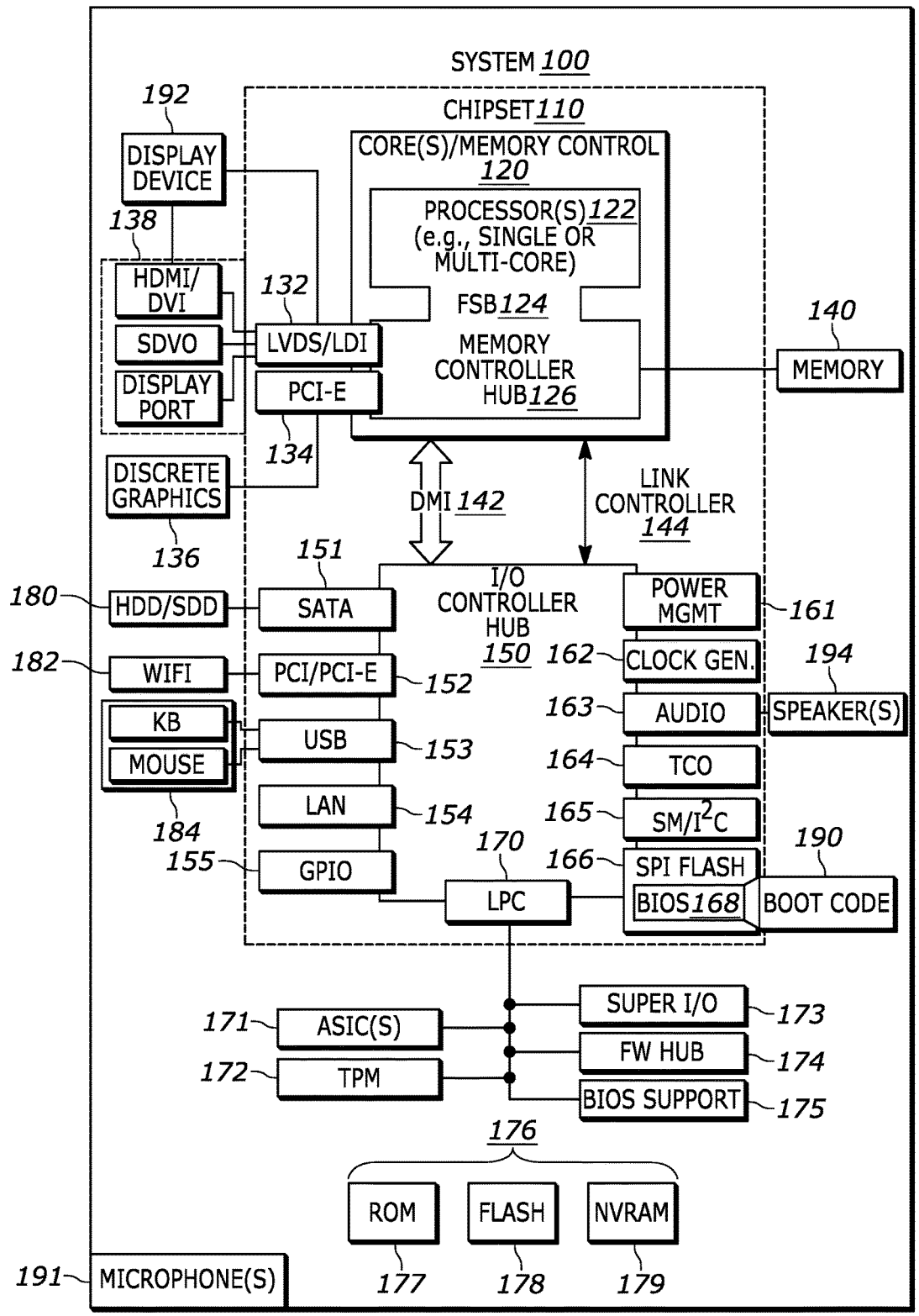
FIG. 1 is a block diagram of an example system consistent with present principles.

Among other things, the detailed description below discusses use of a wakeup word to set an active microphone to whichever microphone hears the user speak the wakeup word. Also discussed below is prompting a user without a wakeup word to set the active microphone.

For example, the device might prompt the user by saying, "I hear you on the headset mike, but it isn't active, shall I make it active for this call?" in the context of a telephone or video call. As another example, the user might speak the wakeup phrase "activate this microphone" or another pre-configured wakeup word to set the active microphone to whichever mike hears the wakeup word or hears it best. Natural wakeup words might also be used, such as "Can you hear me now?"

In some examples, these wakeup words may even be disabled for power savings once the video call or other function is underway. Monitoring for wakeup words may then be reactivated if any microphone/speaker changes are made via software or hardware.

Additionally, if multiple microphones can hear the user, the user can choose which microphone they want to use, and/or the device may attempt to determine which microphone can hear the user best (e.g., to autonomously switch mikes or suggest to the user a mike that can hear the user best). This may be done by transcribing what the user says and choosing the microphone with the higher-confidence speech result.

Implementation may be within the operating system (OS) of the device or within a specific application. For example, the OS might "hear" the user speaking on an inactive microphone and auto-switch, prompt the user, and/or pass that info to the active window and/or unified communication (UC) software running on the device/system. As another example, a specific software application might "hear" the user speaking on an inactive microphone and handle it within that application (or on behalf of another application) by auto-switching, prompting the user, and/or passing that info to the active window and/or UC software.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more audio receivers/microphones 191 that provides input from the microphone(s) 191 to the processor 122 based on audio that is detected, such as via a user providing audible input to the microphone(s) 191.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
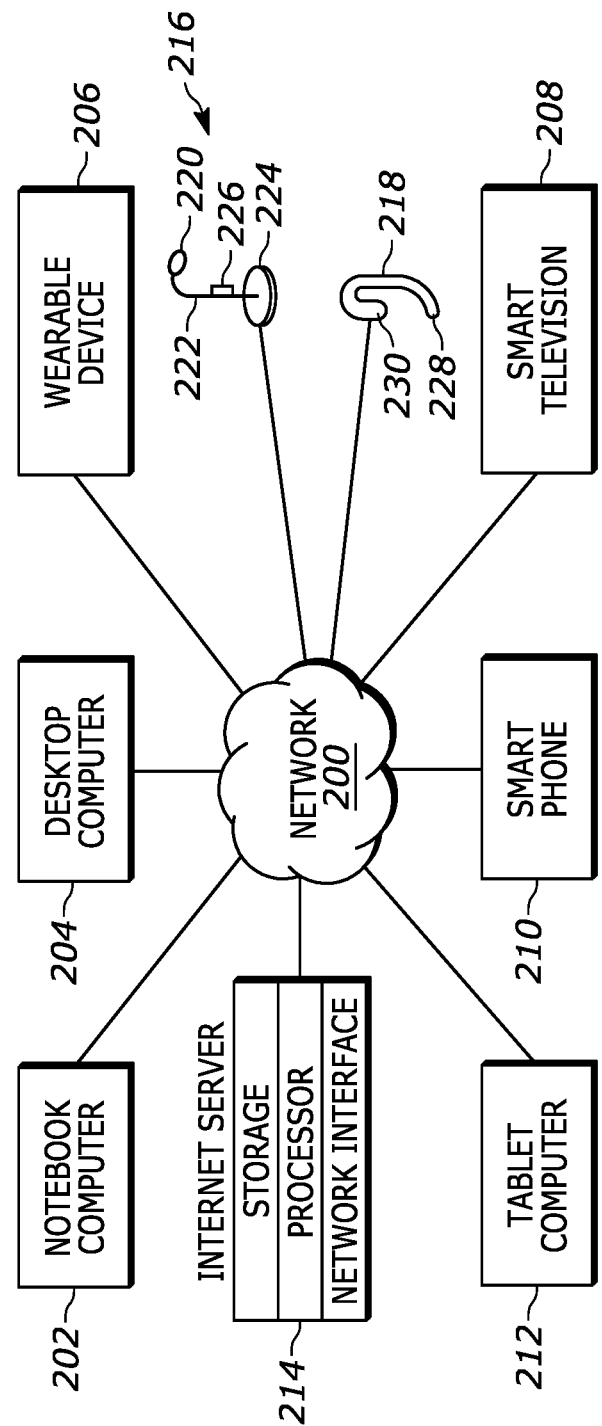
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a stand-alone microphone device 216, a headset 218, and a server 214 such as an Internet server that may provide cloud storage accessible to the devices 202-212, 216, 218. It is to be understood that the devices 202-218 may be configured to communicate with each other over the network 200 to undertake present principles.

Additionally, note that each of the devices 202-218 may include respective built-in microphones coupled to the respective chassis and/or housings of the respective device 202-218. So, in describing the stand-alone microphone device 216 in more detail, note that its own built-in microphone 220 may be located at a distal end of an arm 222 that connects at an opposite and/or proximal end to a base 224 for the device 216 to rest upright on a surface such as a desk or tabletop. Additionally, note that in some examples the device 216 may include a hardware switch or depressable button 226 that may be manipulable between on and off positions to respectively turn on or off the device 216 and hence ability of the microphone 220 to sense audible input. Additionally or alternatively, the element 226 may be manipulable to mute or unmute the microphone 220 so that, when muted, the device 216 does not transmit audible input it detects at the microphone 220 to other devices even though the device 216 remains powered on. Then when unmuted, the device 216 may transmit audible input to the microphone 220 via Bluetooth, the Internet, Wi-Fi, etc. to other devices shown in FIG. 2.

Now describing the headset 218 in more detail, it may be a virtual reality headset, augmented reality headset, smart glasses, or as shown on the face of FIG. 2, a Bluetooth headset. In any of those instances, the headset may be configured for communicating wirelessly with another end-user computing device such as the notebook computer 202 or desktop computer 204 or other device of FIG. 2 similar to the device 216 e.g., for a user to engage in video conferencing. For example, a camera may be located on either of the notebook computer 202 or desktop computer 204 for imaging the user while the headset 218 may communicate with the computer 202 or 204 using wireless Bluetooth communication to provide spoken input from the user as detected at a headset microphone 228 to the computer 202 or 204. The computer 202 or 204 may then transmit both video data of the user from its camera and audio data of the user from the microphone 228 over the Internet to the respective devices of other conference participants that are located at different geographical locations (e.g., different cities, states, countries, etc.). In some examples, the audio and video data may be routed through the server 214 from the computer 202 or 204 before being received by the respective other devices of other conference participants, just as audio data from the device 216 might be routed. As also shown in FIG. 2, the headset 218 may further include at least one speaker 230 for placement proximate to a respective ear of the user when the headset 218 is worn. The speaker 230 may be used for presenting audio from the other respective conference participants during video conferencing.

Figure 3:
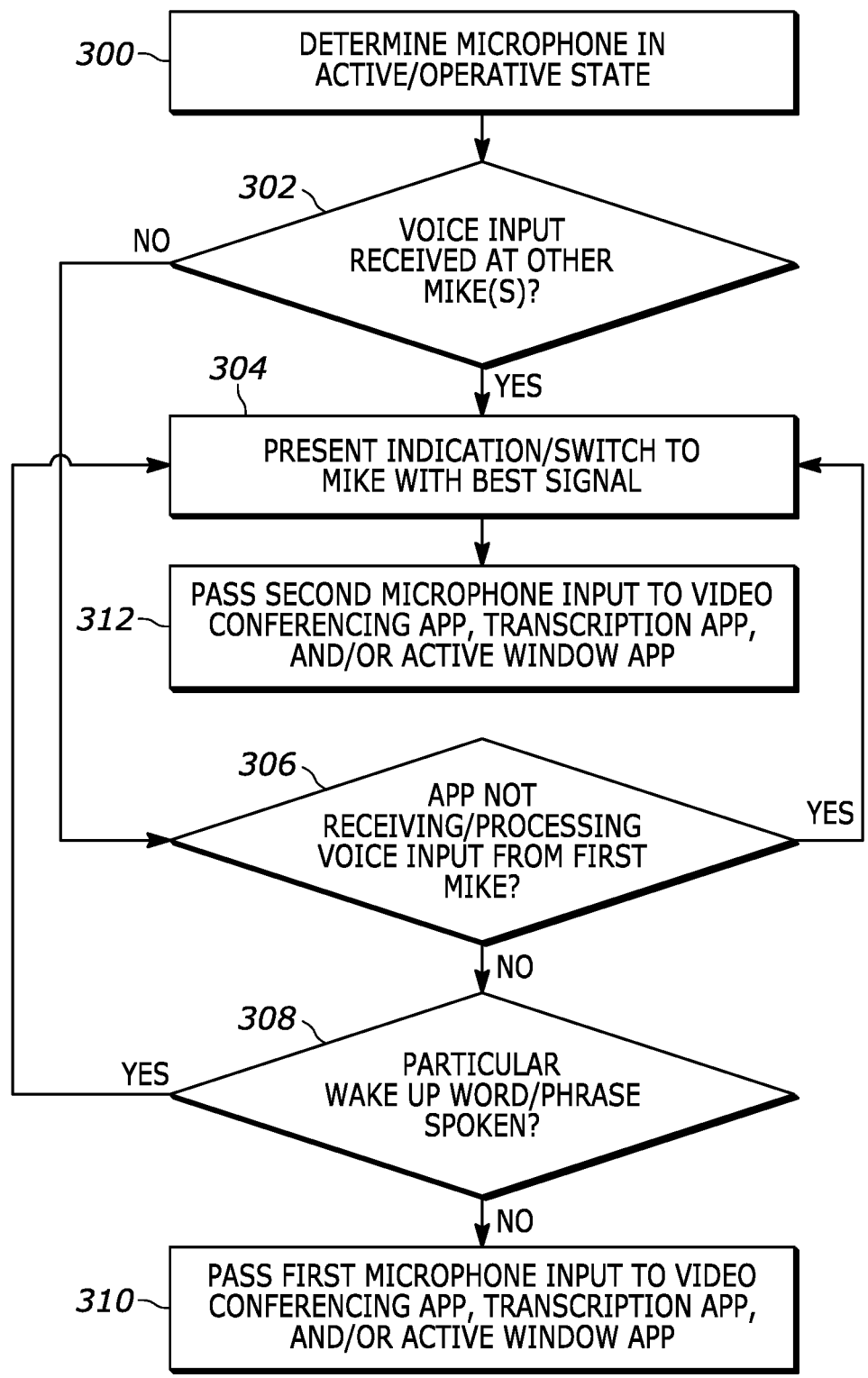
FIG. 3 illustrates example logic in example flow chart format that may be executed by a device to control active state microphone management consistent with present principles.

Referring to FIG. 3, it shows example logic that may be executed by a first device such as the system 100 and/or one or more of the devices of FIG. 2 in any appropriate combination consistent with present principles. Note that while the logic of FIG. 3 is shown in flow chart format, state logic or other suitable logic may also be used. Also note that the logic may be executed by the first device at the guest operating system level or by an individual application already executing at the first device, such as a video conferencing application.

Beginning at block 300, the first device may determine that a first microphone of plural available microphones is in an active and/or operative state for processing voice input using a particular application or the first device's guest operating system itself. For example, the available microphones for a laptop or desktop computer that may be executing the logic of FIG. 3 might include the computer's own built-in microphone as well as a microphone of a stand-alone microphone device like the device 216 of FIG. 2 and a microphone of a headset like the headset 218 of FIG. 2.

Also note that to be available, in various examples the microphones of the stand-alone microphone device and/or headset may or may not be currently communicating with the laptop or desktop computer when block 300 is executed. For example, available microphones might include only those that are currently powered on and communicating with the computer in order to limit the number of available choices and/or to reduce device error in mistakenly switching to a microphone that is powered down (e.g., at a later time as set forth further below). But in other examples where the user might be attempting to use a powered down or non-communicating microphone without realizing it is powered down or not communicating with the computer, to not unintentionally omit those microphones from consideration the first device may also consider microphones that have been previously connected to the computer but that are not currently connected to the computer, and/or microphones that have been previously paired with the computer for control of the microphones by the computer but that are not currently communicating with the computer.

As for the active/operative state itself, it may include the first device processing audible input received at the respective microphone being maintained in the active/operative state. In some examples, the active/operative state may also include the first device not selecting audible input to one microphone while another microphone is being maintained in the active/operative state.

Still further, the active/operative state may include the first device providing audible input to a given microphone to a particular software application that is currently executing at the first device. The particular software application might be a video conferencing application that is currently executing at the first device to provide audio generated based on audible input to the active/operative microphone to a second device as part of a video conference. Additionally, or alternatively, the particular software application may be currently executing at the first device to transcribe audible input to the active/operative microphone to text, e.g., as part of voice dictation to a word processing document or as part of speech to text for execution of a command or request using a digital assistant.

From block 300 the logic may then proceed to decision diamond 302. At diamond 302 the first device may determine whether, despite the first microphone is being maintained in the active/operative state by the first device, voice input is being received at a second microphone different from the first microphone. For example, the first microphone might be the built-in microphone of a laptop computer executing the logic of FIG. 3 or the microphone of a stand-alone microphone device, but input is being received at another microphone on a separate headset based on the user beginning to talk as part of a video conference using the headset without realizing the headset microphone is not the active/operative microphone.

Thus, based on an affirmative determination at diamond 302 that the first microphone is being maintained in the active/operative state, but that voice input is being received at the second microphone, the logic may move to block 304 where the first device may present one or more notifications at the first device that the first microphone is being maintained in the active/operative state. Graphical examples of various notifications that may be presented will be discussed below in reference to FIGS. 4-6. However, further note that audible notifications may also be provided via one or more speakers on the first device, such as computer-generated voices speaking the words of the graphical notifications of FIGS. 4-6 themselves.

In addition to or in lieu of presenting the notifications, also note that at block 304 the first device may autonomously switch the microphone selected for the active/operative state from the first microphone to the second microphone (or autonomously place the second microphone in the active state if no microphone was previously in the active state at block 300). The switch may be performed based on the second microphone providing a better audio signal for words spoken by the user. For example, a respective microphone providing an audio signal with the most gain/volume peaks for spoken words and/or with the highest peaks in the signals' waveform as output by audio equalizer software may be selected for placement in the active/operative state over other microphones indicating signals of less volume/gain or lesser highest peaks for that respective microphone.

Additionally or alternatively, to automatically switch the respective microphone selected for the active/operative state from the first microphone to the second microphone (or still another microphone), the first device may execute speech transcription software and/or speech to text software to transcribe to text spoken words detected at each microphone detecting the same spoken words. Since the transcription from each microphone's input may have an associated level of confidence in the accuracy of the transcription, the first device may select the respective microphone from which the transcription with the highest level of confidence was generated as the microphone to place in the active/operative state. In various examples, the software used for the transcribing and level of confidence outputs may be embodied in a digital assistant such as, e.g., Amazon's Alexa, Apple's Siri, or Google's Assistant.

Still further, to automatically switch the respective microphone selected for the active/operative state from the first microphone to the second microphone (or still another microphone), the first device may also determine that touch sensors on a respective device that has a respective microphone have received touch input within a threshold time of a current time, and/or that motion sensors such as a gyroscope or accelerometer on the respective device indicate motion of the respective device within a threshold time of a current time. This may imply that the user intends to use the respective microphone on the respective device and so that microphone may be placed in the active/operative state. Thus, the touch and/or motion sensors might be located on a headset or stand-alone microphone device, for example. And further note that proximity sensors and/or cameras may also be used to determine which microphone the user is nearest to or holding/wearing to infer that the active/operative state should be switched to that respective microphone.

Still in reference to diamond 302, note that responsive to a negative determination the logic may proceed to decision diamond 306 rather than block 300. At diamond 306 the first device may determine whether the first microphone has been selected for processing voice input using a particular application like a video conferencing application or voice recording application, but that the particular application is not currently processing voice input from the first microphone and/or not currently receiving voice input from the first microphone.

An affirmative determination at diamond 306 may cause the logic to proceed to block 304 and execute block 304 as described above. However, a negative determination at diamond 306 may instead cause the logic to proceed to decision diamond 308.

At diamond 308 the logic may determine whether a particular word or phrase has been spoken based on audible input received at another available microphone other than the first microphone. For example, the particular word or phrase may be predetermined, such as a predetermined wake up word/phrase like "use microphone on headset", "use microphone on laptop", or "use this microphone" to trigger/command the first device to switch the active state microphone to the one identified in the spoken words or a given microphone at which the word/phrase was heard (or heard best, as determined per the description of block 304 through highest gain, waveform, level of confidence, etc.).

Additionally or alternatively, the word or phrase may be dynamically determined rather than predetermined to trigger an affirmative determination at diamond 308. For example, natural language understanding (NLU) may be executed to infer user intent to switch to a certain available microphone based on the content of the spoken words. For example, the spoken words might include "can you hear me now?" or "why can't they hear me?" in the context of a video conference.

An affirmative determination at diamond 308 may cause the logic to proceed to block 304 and execute block 304 as described above (e.g., to switch to the microphone that hears the user the best). However, a negative determination at diamond 308 may instead cause the logic to proceed to block 310.

At block 310 the first device may pass data/audio input provided to the first microphone to a particular software application executing at the first device, possibly as routed through a guest operating system (GOS) of the first device like Windows, Linux, or Mac OS if the active/operative microphone is being controlled at the GOS level. Or if the active/operative microphone feed does not first pass through the GOS, the first microphone may simply pass the audio data to the particular software application itself.

The particular software application may be, for example, video conferencing software like Zoom or Teams, a voice transcription or dictation application, a Von' application, etc. The particular software application may also be a digital assistant application or any other application executing under control of the GOS, including any particular software application presenting an active window on a display of the first device (e.g., whatever window is not minimized or has other windows overlaid thereon but rather is in the foreground and possibly presented over top of any other windows partially presented).

Now referring back to block 304, note that from block 304 the logic may proceed to block 312 based on a user command to switch the active/operative microphone as might be received at block 304 and/or based on the first device itself autonomously switching the active/operative microphone as already described (e.g., based on highest gain level or highest confidence level in speech to text transcription). At block 312 the first device may pass data/input from the second microphone that was made the active/operative microphone to the particular software application described above (e.g., a video conference application), possibly again as routed through the GOS to the particular application if the active/operative microphone is being controlled at the GOS level. Or again if the active/operative microphone feed does not first pass through the GOS, the second microphone may simply pass the audio data to the particular software application itself.

Figure 4:
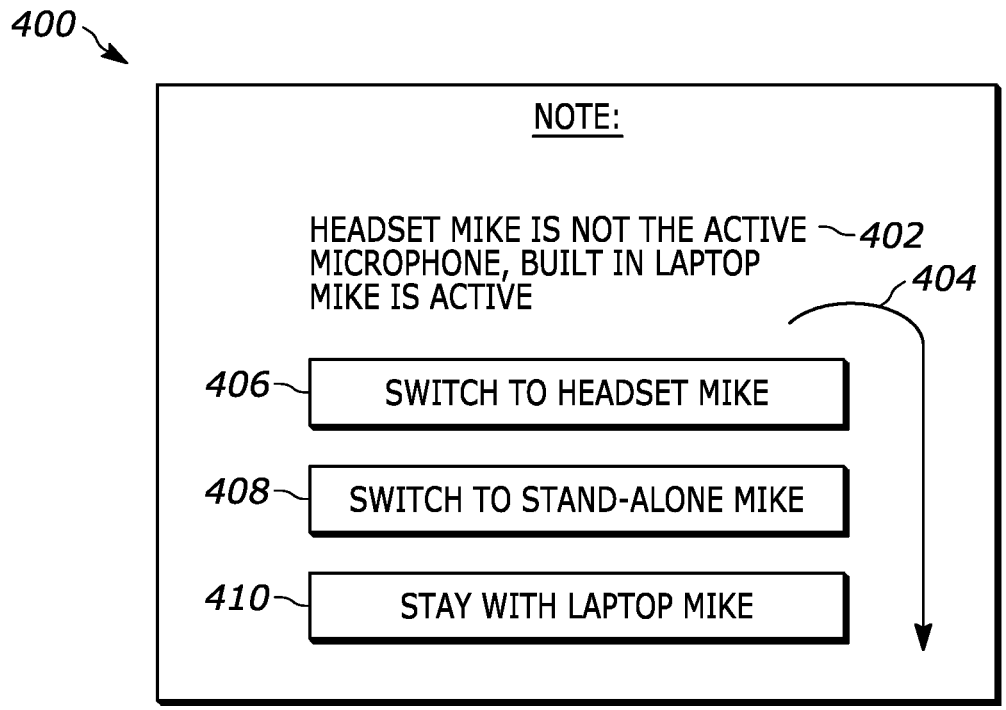
FIGS. 4-6 show various example graphical user interfaces (GUIs) that may be presented on a display of a device to indicate an active state microphone and afford a user options for active state microphone selection.

Continuing the detailed description in reference to FIG. 4, an example graphical indication/notification is shown that might be presented on a display of the first device of FIG. 3 at block 304 as described above. As shown, the indication is presented in the form of a graphical user interface (GUI) 400 including an indication 402 prompting that a certain microphone on a laptop computer is being maintained in an active/operative state while a microphone on a headset is not. The indication 402 may list the headset microphone as not being in the active state based on detecting spoken words at it (e.g., with a higher level of confidence or owing to better audio signal as set forth above).

As also shown, in some examples an arrow 404 may be presented on the GUI 400 to point to the microphone in real space that is currently set to the active state. In this case, the arrow 404 points to the laptop's microphone on a portion of the housing to which the display itself is also coupled.

The GUI 400 may also prompt that the user might want to switch to the microphone on the headset by way of a selector 406. The selector 406 may be selectable based on touch or cursor input to command the device to switch from the laptop microphone being in the active state to the headset microphone being in the active state. Additionally, if desired other selectors may also be presented to switch to another available microphone as the active-state microphone, such as a selector 408 to command the device to place a microphone on a stand-alone microphone device in the active state. However, a selector 410 may also be presented to command the device to maintain the laptop microphone as the active state/operative microphone.

Figure 5:
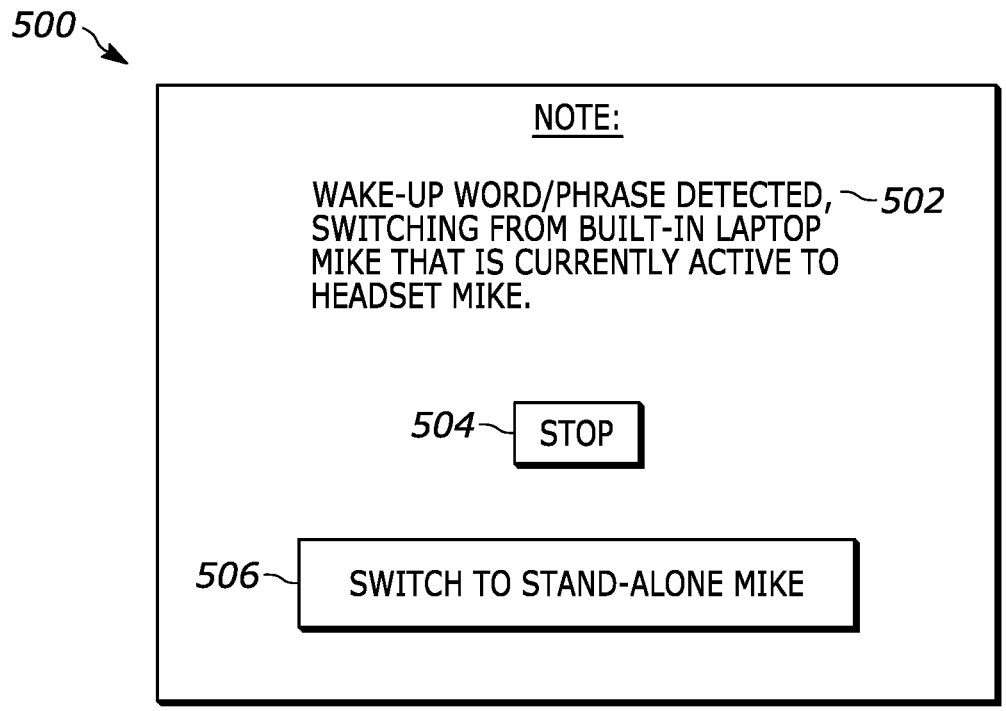

Now in reference to FIG. 5, yet another GUI 500 is shown. The GUI 500 may be presented on a display, for example, responsive to detecting a predetermined or dynamically determined wake up word or phrase as being spoken at diamond 308 per the description above. The GUI 500 may include an indication or prompt 502 that the wake-up word or phrase has been detected and indicating that the active/operative microphone is being switched from an available built-in laptop microphone that is currently in the active state to an available headset microphone. If desired, the GUI 500 may also include a stop selector 504 to command the device to stop the switch and to continue to maintain the laptop microphone in the operative/active state. Also if desired, the GUI 500 may include a selector 506 that may be selectable to instead command the device to switch the active/operative microphone to still another microphone on another device (e.g., on a stand-alone microphone device or on a stand-alone digital assistant device).

Figure 6:
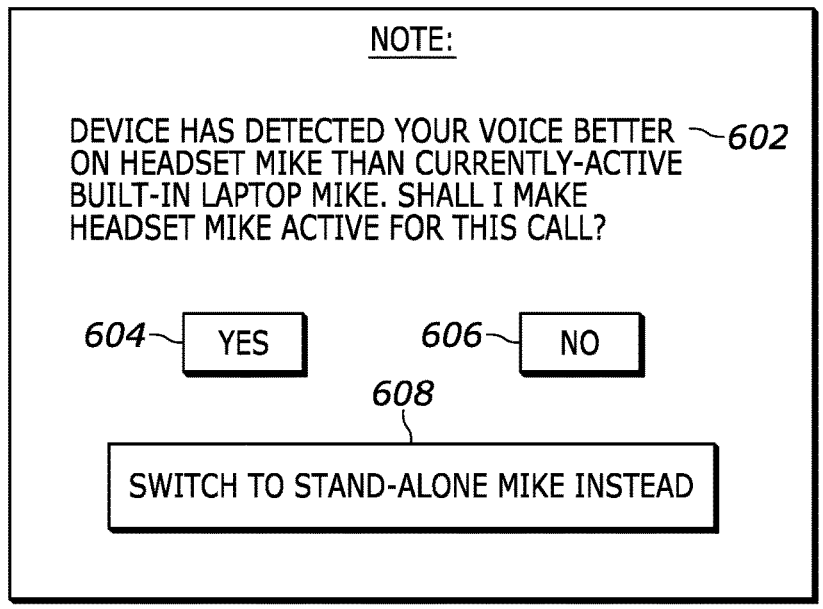

Moving on to FIG. 6, it shows still another GUI 600 that may be presented on a display of a device controlling active microphone use. The GUI 600 may be presented responsive to, for example, an affirmative determination at diamond 302 of FIG. 3 where a device has detected one of plural available, powered-on microphones as indicating a better audio signal of an end-user's voice than other available microphones, including a currently-active laptop microphone. In this example, the available microphone indicating a better audio signal of the user speaking than the currently-set active microphone is a microphone on a headset (such as the headset 218 of FIG. 2).

Accordingly, as shown in FIG. 6, the GUI 600 may include an indication or prompt 602 that that the device has detected the user's voice better on the headset's microphone than the device's own currently-active microphone (a laptop per this example). The prompt 602 may also ask the user whether the device should switch to the headset microphone as the active/operative microphone for a video conference call that is about to transpire or that has already begun. The GUI 600 may therefore include a yes selector 604 that may be selectable to command the laptop to make the switch, and a no selector 606 to command the laptop to continue maintaining the laptop's own built-in microphone in the active state. If desired, the GUI 600 may also include a selector 608 that may be selectable to instead command the device to switch the active/operative microphone to still another microphone on another device (e.g., one on a stand-alone microphone device).

Figure 7:
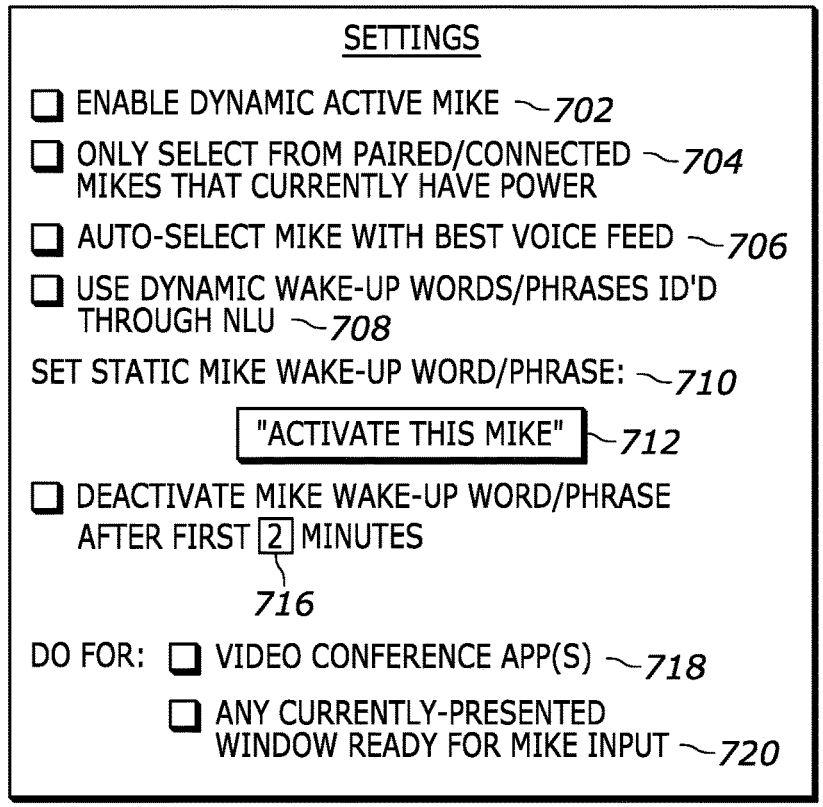
FIG. 7 shows an example settings GUI that may be presented on a display to configure one or more settings of the device to operative consistent with present principles.

Now describing FIG. 7, it shows yet another example GUI 700 that may be presented on a display of a device configured to undertake present principles, such as the display of the first device executing the logic of FIG. 3. The GUI 700 may be presented based on navigation of a settings menu and may be used for configuring one or more settings for switching between various microphones in order to place one or another in an active state consistent with present principles. It is to be understood that each option to be discussed below may be selected by directing touch or cursor input to the respectively adjacent check box.

As shown in FIG. 7, the GUI 700 may include a first option 702 that may be selectable to set or configure the first device to, in the future, determine an operative microphone from among plural available microphones and take one or more actions at the first device based on the determination (like maintaining a certain microphone in an active state or switching to another microphone to place the other microphone in the active state). For example, selection of the option 702 may set or enable the first device to undertake the logic of FIG. 3 as well as to present the GUIs of FIGS. 4-6.

As also shown in FIG. 7, the GUI 700 may include another option 704 that may be selectable to set or enable the first device to, when determining whether to switch maintaining one microphone in an active state to maintaining another microphone in an active state, only consider and select from among available microphones for respective devices that have not just been paired with and/or connected to the first device in the past but that are also currently powered on/maintaining an active communication link with the first device.

Still further, if desired the GUI 700 may include an option 706 that may be selectable to set or enable the first device to autonomously select a microphone to place in an active state based on that respective microphone indicating a better audio signal for words spoken by the user than other available microphones that might have also picked up the same words (and/or if only one microphone picked up the words, select that microphone).

Additionally, the GUI 700 may include an option 708 that may be selectable to set or enable the first device to specifically monitor for and recognize dynamic wake up words using natural language understanding as set forth above in order to determine that a certain microphone should be placed in an active state. Also, if desired, the GUI 700 may further include a setting 710 at which a user may enter, to text input box 712, a particular static wake up word or phrase to monitor for in the future. In the present example, a static wake up phrase of "activate this mike" has been entered into box 712 so that, when that phrase is detected, the first device might be triggered to determine which available microphone is providing the best audio signal of the user's voice speaking those words compared to other microphones and then switch that microphone to an active state.

However, to help avoid false triggers, the GUI 700 may further include an option 714 that may be selected to set or enable the first device to stop monitoring for triggering wake up words or phrases after a predetermined amount of time has passed during which the first device executes a particular function using a microphone in an active state. For example, the threshold amount of time may be two minutes after a video conference has started, so that should the user speak something as part of the conference that might otherwise be recognized as a wake-up word or phrase, it will not be recognized as such. Thus, a number entry box 716 may be presented for the user to establish the threshold amount of time, which is two minutes in this example. However, further note that the threshold amount of time might be reset and begin anew during the conference if, for example, the user switches which microphone is in an active state during the conference using a software switch or hardware switch so that wake-up words/phrases may be monitored for anew during the renewed threshold amount of time.

Also, if desired, the GUI 700 may include options to select particular applications and/or functions for which to make determinations regarding active microphone use and to possibly switch microphones. So, for example, option 718 may be selected to command the first device to perform the logic of FIG. 3 for video conference applications that are executing for video conferencing. Option 720 may be selected to command the first device to perform the logic of FIG. 3 for any application that is both currently presenting a window in the foreground on the first device's display and configured to use/process microphone input. Options for other specific application types and functions may be listed as well. Thus, the options 718, 720 and any similar ones may be presented so that determinations involving which microphone to place in an active state are not performed constantly, which may drain battery life and consume processor resources, but to only make those determinations under certain conditions and/or when certain applications or application types are executing.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
    at least one processor; and
    storage accessible to the at least one processor and comprising instructions executable by the at least one processor to:
    determine that a first microphone from among plural available microphones is being maintained in an active state by the first device; and
    based on the determination that the first microphone is being maintained in the active state, present an indication at the first device that the first microphone is being maintained in the active state;
    wherein the indication comprises a graphical notification and/or audible notification, the notification(s) indicating that a user should switch from using a second microphone to using the first microphone, the second microphone being different from the first microphone.

2. The first device of claim 1, wherein the active state comprises the first device processing audible input received at a respective microphone being maintained in the active state.

3. The first device of claim 2, wherein the active state comprises the first device not selecting audible input to one microphone while another microphone is being maintained in the active state.

4. The first device of claim 1, wherein the active state comprises the first device providing audible input to the first microphone to a particular software application that is currently executing at the first device.

5. The first device of claim 4, wherein the particular software application is currently executing at the first device to provide audio generated based on audible input to the first microphone to a second device as part of a video conference.

6. The first device of claim 4, wherein the particular software application is currently executing at the first device to transcribe audible input to the first microphone to text.

7. The first device of claim 1, wherein the plural available microphones comprise one or more of: one or more microphones that have been previously connected to the first device but that are not currently connected to the first device, one or more microphones that have been previously paired with the first device but that are not currently communicating with the first device.

8. The first device of claim 1, wherein the plural available microphones comprise microphones that are currently communicating with the first device, but not microphones that are currently not communicating with the first device.

9. The first device of claim 1, wherein the instructions are executable to:
    determine that the first microphone is being maintained in the active state by the first device, but that voice input is being received at the second microphone; and
    based on the determination that the first microphone is being maintained in the active state, but that voice input is being received at the second microphone, present the indication at the first device that the first microphone is being maintained in the active state.

10. The first device of claim 1, wherein the indication is a first indication, and wherein the instructions are executable to:
    identify a particular phrase as being spoken based on audible input received at the first device;
    based on identifying the particular phrase as being spoken based on the audible input, switch from maintaining the first microphone in the active state to maintaining the second microphone in the active state; and
    based on identifying the particular phrase as being spoken based on the audible input, present a second indication at the first device, wherein the second indication indicates that the first microphone is being switched from being maintained in the active state.

11. The first device of claim 1, wherein the indication comprises the graphical notification, the graphical notification presented as part of a graphical user interface (GUI), the GUI comprising a selector that is selectable to switch from using the second microphone to using the first microphone.

12. The first device of claim 1, wherein the indication comprises the audible notification, the audible notification comprising a computer-generated voice indicating that the user should switch from using the second microphone to using the first microphone.

13. A method, comprising:
    determining an operative microphone of a first device from among plural available microphones; and
    based on the determining of the operative microphone, taking one or more actions at the first device;
    wherein the one or more actions comprise presenting an indication at the first device that a first microphone is the operative microphone, the indication comprising one or more of: a graphical notification, an audible notification;
    wherein the notification(s) indicate that a user should switch from using a second microphone to using the first microphone, the second microphone being different from the first microphone.

14. The method of claim 13, wherein the one or more actions comprise passing data regarding the operative microphone from a guest operating system of the first device to video conferencing software.

15. The method of claim 13, wherein the one or more actions comprise passing data regarding the operative microphone from a guest operating system of the first device to software presenting an active window on a display of the first device.

16. The method device of claim 13, wherein the indication comprises the graphical notification, the graphical notification presented as part of a graphical user interface (GUI), the GUI comprising a selector that is selectable to switch from using the second microphone to using the first microphone.

17. The method device of claim 13, wherein the indication comprises the audible notification, the audible notification comprising a computer-generated voice indicating that the user should switch from using the second microphone to using the first microphone.

18. At least one computer readable storage medium (CRSM) that is not a transitory signal, the computer readable storage medium comprising instructions executable by at least one processor to:
    determine that a first microphone has been selected for processing voice input using a particular application executing at a first device; and
    based on the determination, take one or more actions at the first device for the particular application to use the first microphone;
    wherein the one or more actions comprise presenting an indication at the first device that the first microphone has been selected for processing voice input using the particular application, the indication comprising one or more of: a graphical notification, an audible notification;
    wherein the notification(s) indicate that a user should switch from using a second microphone to using the first microphone, the second microphone being different from the first microphone.

19. The CRSM of claim 18, wherein the determination comprises determining that the first microphone has been selected for processing voice input using the particular application but that the particular application is one or more of: not currently processing voice input from the first microphone, not currently receiving voice input from the first microphone.

20. The CRSM of claim 18, wherein the indication comprises the graphical notification, the graphical notification presented as part of a graphical user interface (GUI), the GUI comprising a selector that is selectable to switch from using the second microphone to using the first microphone.

* * * * *